United States Patent [19]

Kondo

[11] 4,183,641
[45] Jan. 15, 1980

[54] FOCUS DETECTING DEVICE

[75] Inventor: Toshihiro Kondo, Chofu, Japan

[73] Assignee: Fuji Photo Film Co., Ltd., Minami-ashigara, Japan; a part interest

[21] Appl. No.: 892,865

[22] Filed: Apr. 3, 1978

[30] Foreign Application Priority Data

Apr. 4, 1977 [JP] Japan .................. 52/38262

[51] Int. Cl.² .............................................. G03B 13/18
[52] U.S. Cl. ........................................ 354/25; 354/31; 352/140; 352/139
[58] Field of Search ................. 354/25, 31; 352/140, 352/139; 250/201, 204; 356/124–127

[56] References Cited

U.S. PATENT DOCUMENTS

| 2,258,903 | 10/1941 | Mitchell | 352/140 X |
|---|---|---|---|
| 3,367,254 | 2/1968 | Townsley | 354/25 |
| 3,631,785 | 1/1972 | Perlman et al. | 354/25 |
| 3,691,922 | 9/1972 | Konig | 354/25 |
| 3,896,457 | 7/1975 | Yamanishi et al. | 354/25 |
| 3,950,764 | 4/1976 | Hosoe et al. | 354/25 |
| 3,988,747 | 10/1976 | Lermann et al. | 354/25 |
| 4,060,725 | 11/1977 | Hoshika | 354/201 X |
| 4,090,209 | 5/1978 | Kondo | 354/25 |
| 4,114,994 | 9/1978 | Kondo | 354/25 X |

FOREIGN PATENT DOCUMENTS 2659009  7/1977  Fed. Rep. of Germany ............ 354/25

OTHER PUBLICATIONS

Automatic Focusing, Peter MacKeith, Brit. J. of Photo., 4 Jul. 1975, pp. 594–596.

Primary Examiner—L. T. Hix
Assistant Examiner—William B. Perkey
Attorney, Agent, or Firm—Harold L. Stults; William F. Lawrence

[57] ABSTRACT

In an automatic focus detecting device in which a vibrating prism is provided on the focal plane of an objective of an optical instrument such as a camera, a photodetector element used for detecting focus is composed of a central element functioning as a main photodetector and a marginal element or elements functioning as a sub-photodetector. The marginal element detects the vibration of the image of a non-principal subject matter existing in the vicinity of a principal subject matter. The central element detects the vibration of the image of the principal subject matter. The output of the marginal element is used to compensate for the noise in the output of the central element.

6 Claims, 29 Drawing Figures

FIG. 1
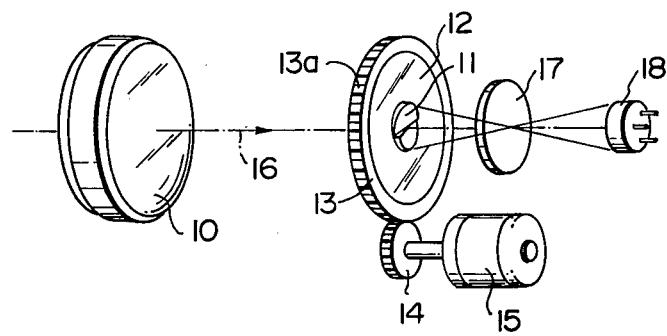
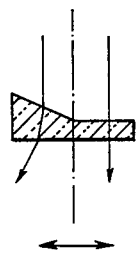
FIG.2A
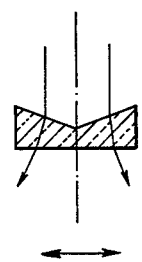
FIG.2B
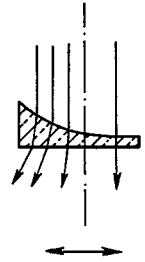
FIG.2C
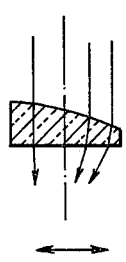
FIG.2D
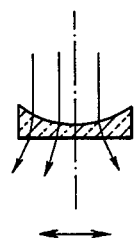
FIG.2E
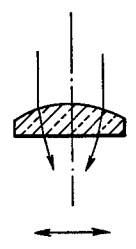
FIG.2F
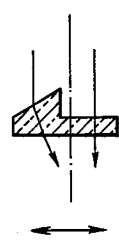
FIG.2G
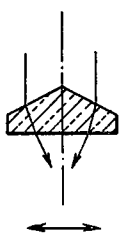
FIG.2H
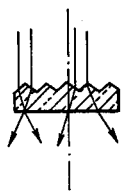
FIG.2I
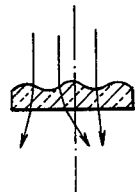
FIG.2J
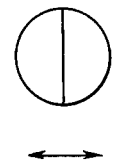
FIG.2K
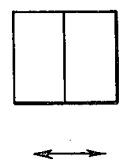
FIG.2L FIG.3A  FIG.3C  FIG.3E
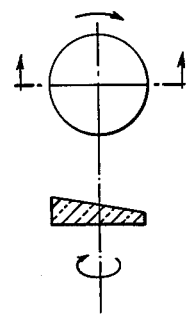
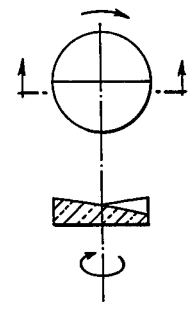
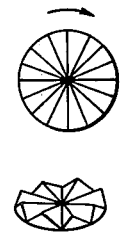
FIG.3B  FIG.3D  FIG.3F
FIG.4A  FIG.5A
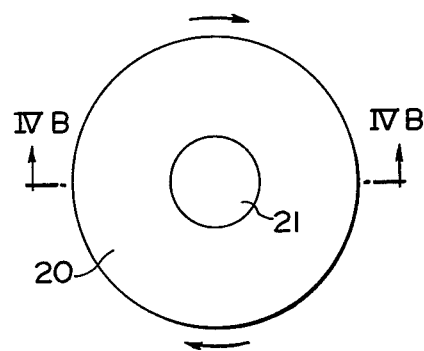
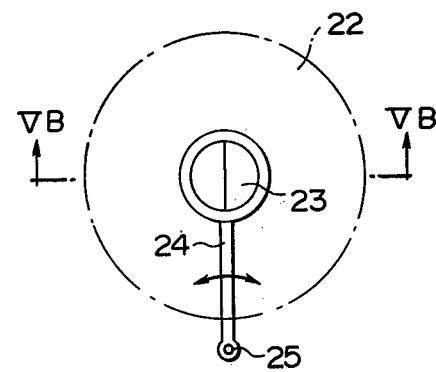
FIG.4B  FIG.5B
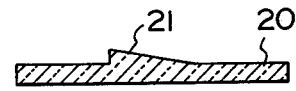

FOCUS DETECTING DEVICE

BACKGROUND OF THE INVENTION

1. Field of the Invention

This invention relates to a device for detecting a focus in an optical instrument, and more particularly to a device for detecting the position of an objective of an optical instrument where the image of an object is focused on a plane where a sharp image is desired to be focused. This invention is particularly applicable to a photographic camera for automatically focusing an image on a film in the camera.

2. Description of the Prior Art

It has been known in the art to detect a focus in an optical instrument by use of a vibrating prism or the like. For instance, the basic principle of the automatic focusing method using a vibrating prism is disclosed in The British Journal of Photography, July 1975, P.594-596 and also mentioned in copending U.S. patent applications (Ser. No. 750,005 now U.S. Pat. Nos. 4,114,994 and 754,699) now U.S. Pat. No. 4,090,209, filed Dec. 13 and 27, 1976.

The vibrating prism or the like is periodically vibrated in a direction perpendicular to the optical axis of an objective substantially on the focal plane of the objective. When the image focused by the objective is accurately focused on the vibrating prism or the like, the image viewed from the back of the prism or the like stands still. When the image is not accurately focused on the prism, the image viewed from the back of the prism or the like vibrates. The vibration of the image is electrically detected by a means for detecting vibration of an image. The means for detecting vibration of an image uses an electric circuit for detecting an alternating current component of an output of a photodetector. The alternating current component taken out by the circuit is amplified and rectified.

The above described focus detecting device is advantageous in that the focus is detected with high response even in case of a dark and/or moving subject matter. This device is, however, disadvantageous in that the correct focus detection cannot be expected when a subject matter having high contrast exists, in the image, in the vicinity of the principal subject matter (mainly a figure). This is because the photodetector used for receiving light from the principal subject matter has a definite size which will possibly also cover the non-principal subject matter existing in the vicinity of the principal subject matter. If the non-principal subject matter is at the same distance as the principal subject matter, there is no problem. However, if the non-principal subject matter and the principal subject matter are at the different distances, there is a fear of detecting the focus with respect to the non-principal subject matter.

SUMMARY OF THE INVENTION

The primary object of the present invention is to provide a device for detecting a focus in an optical instrument in which the correct focus detection can be effected even when a non-principal subject matter of high contrast located at a different distance from the camera from that of the principal subject matter exists in the vicinity of the principal subject matter in the image.

The focus detecting device in accordance with the present invention is characterized in that a sub-photodetector which measures the brightness of an area adjacent to the central portion of the subject matter is provided in addition to the main photodetector which measures the brightness of the central portion of the subject matter. The main photodetector measures the brightness of the central portion and the sub-photodetector measures the brightness of the area adjacent to the central portion of the subject matter. The output of the sub-photodetector functions to compensate for the output of the main photodetector to eliminate the error caused by the vibration of the image of the non-principal subject matter. The output of the sub-photodetector is subtracted from the output of the main photodetector to make the compensation.

BRIEF DESCRIPTION OF THE DRAWING

FIG. 1 is a perspective view showing an optical system employed in the focus detecting device in accordance with an embodiment of the present invention, FIGS. 2A to 2J are sectional views showing various examples of a light refracting element employed in the optical system of the focus detecting device of this invention, FIGS. 2K and 2L are front views thereof, FIGS. 3A to 3F are views showing other examples of the refractive optical element which are rotated when used, FIGS. 4A and 4B are front and side sectional views of a plate integrally provided with a prism block employed in an embodiment of the present invention, FIGS. 5A and 5B are front and side sectional views of a prism drive means employed in an embodiment of the present invention.

DESCRIPTION OF THE PREFERRED EMBODIMENTS

Figure 6:
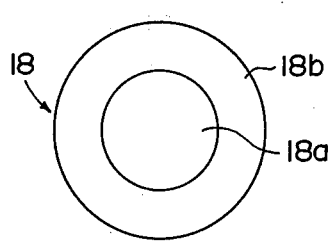
FIG. 6 is a front view of an example of a photodetector employed in an embodiment of the present invention.

FIG. 1 shows an optical system employed in the focus detecting device in accordance with an embodiment of this invention. A light refracting element 11 is located substantially on the focal plane of an objective 10 such as an objective of a photographic camera. The light refracting element is mounted on a transparent focusing plate 12 at the center thereof. The focusing plate 12 is mounted to an annular frame 13 which has teeth 13a on the periphery thereof. The teeth 13a are meshed with a pinion 14 driven by a motor 15 so that the focusing plate 12 is rotated about an optical axis 16 of the objective 10.

Behind the light refracting element 11 is located a focusing lens 17 which focuses an image of a real image focused on the focal plane of the objective 10 in the vicinity of the focusing plate 12. The focusing lens 17 focuses an image of the real image onto a photodetector 18 such as a CdS photoelectric element.

In the above described optical system, the refracting element 11 is rotated or revolved about the optical axis 16 of the objective 10 by driving the motor 15. When the image is accurately focused by the objective 10 on the refracting element 11 mounted on the focusing plate 12, the image focused on the photodetector 18 stands still as the refracting element 11 is rotated. When the image is focused at a distance from the focal plate 12, the image focused on the photodetector 18 vibrates as the refracting element 11 is rotated. The refracting element 11 is a prism-like element which varies or changes the direction of refraction of a light beam passing therethrough as the every part of the element moves in the direction perpendicular to the optical axis. The detailed description of the refracting element is described in the copending U.S. Patent Application Ser. No. 754,699, and accordingly, the detailed description thereof is omitted here.

The vibration of the image can be detected in the form of variation or change in the output of the photodetector 18. The output of the photodetector 18 is varied or changed periodically when the image is vibrated by the rotation of the refracting element 11. Therefore, by taking the alternating current component out of the output of the photodetector, the vibration of the image can be distinguished from the variation or change in output based on the movement of the subject matter. Since the frequency of movement of the subject matter is comparatively low, the frequency of vibration of the image caused by the rotation of the refracting element 11 is desired to be as high as possible so that the vibration of the image can easily be distinguished from the vibration of the image based on the natural vibration or movement of the subject matter.

As the light refracting element 11, various types of prism can be employed. Several examples of the refracting element are shown in FIGS. 2A to 2J. These prisms are reciprocated in the direction as indicated by arrows. The shape of the prisms viewed from front may be as shown in FIG. 2K or 2L. The prisms as shown in FIGS. 2A, 2C, 2D and 2G may be rotated about their centers. FIGS. 3A and 3B show an example of the prism as shown in FIG. 2D which is rotated about its center. FIGS. 3C and 3D show still another example of the prism rotated about its center. The prism as shown in FIGS. 3C and 3D is comprised of two semi-circular prisms combined to form a split image type prism. Another example of the prism which is rotated about its center is shown in FIGS. 3E and 3F.

The light refracting element 11 may be of any size so long as the vibrating part of the image has a sufficiently large recognizable size. But preferably, only a central part of the image is vibrated by the vibrating refracting element 11 and the remaining part of the image is viewed as it is. Therefore, the refracting element is desirably formed as a part 21 of a transparent focusing plate 20 as shown in FIGS. 4A and 4B. The prism like part 21 of the element shown corresponds to the prism as shown in FIGS. 3A and 3B.

Further, it is possible to provide a prism 23 mounted to a swingable arm 24 which is swingable about a pivot 25 so that the prism 23 may be moved back and forth in the field of view 22 of the optical instrument. Furthermore, it is possible to move the light refracting element 11 along a circle, namely, rotate it about the optical axis without revolving the element. It is also possible to rotate or revolve the element about an axis extending perpendicular to the optical axis of the optical instrument.

In order to amplify the variation in the output of the photodetector caused by the vibration or periodical movement of the vibrating prism, it is desirable to provide a mask or slit in front of the photodetector. When a slit is provided, the slit should extend in the direction perpendicular to the direction in which the image reciprocates as the vibrating prism vibrates in case where the prism is reciprocated, i.e., not rotated. When the prism is rotated, slit may be in any direction.

Figure 7:
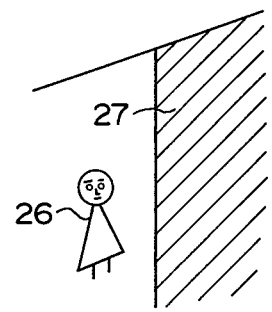
FIG. 7 is a view showing a principal subject matter standing by a non-principal subject matter having high contrast.

The photodetector 18, as shown in FIG. 6, comprises a central element 18a and an annular marginal element 18b, the former functioning as a main photodetector and the latter as a sub-photodetector. By use of this photodetector 18, it is possible to correctly detect the focus even when a non-principal subject matter having high contrast as indicated at 27 in FIG. 7 exists in the vicinity of the principal subject matter 26.

Figure 8A:
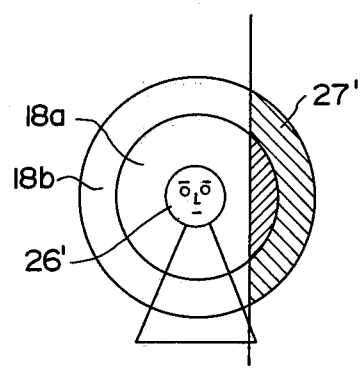
FIGS. 8A and 8B are front views of a photodetector for explaining the vibration of the image of the non-principal subject matter with respect to the image of the principal subject matter.
Figure 8B:
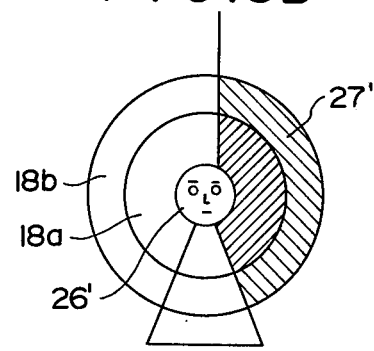

As shown in FIGS. 8A and 8B, when the subject matter 26 of a figure which is the principal subject matter is correctly focused on the photodetector 18, the image 26' of the subject matter 26 stands still but the image 27' of the non-principal subject matter 27 vibrates as the light refracting element 11 is vibrated. In this case, the output of the central element 18a of the photodetector 18 has an alternating current component as a noise. However, it should be determined in this case that the image of the subject matter is correctly focused. In accordance with this invention wherein an additional photodetector represented by the marginal element 18b is provided, the vibration of the image of the non-principal subject matter is taken out by the marginal element 18b. Therefore, by compensating the output of the central element 18a by use of the output of the marginal element 18b, the noise based on the vibrating image 27' of the non-principal subject matter 27 can be eliminated.

Figure 9:
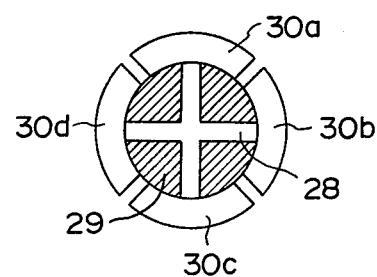
FIG. 9 is a front view showing another example of a photodetector which can be employed in the present invention.
Figure 10:
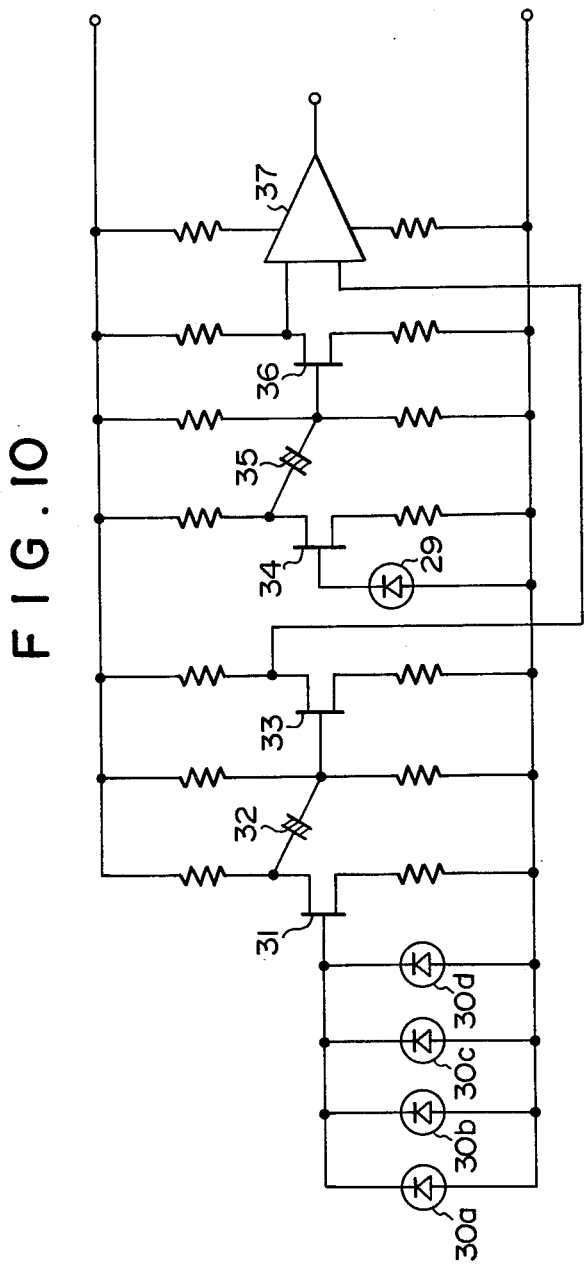
FIG. 10 is a circuit diagram which shows an example of a circuit for taking out an alternating current component from the output of a photodetector.

FIG. 9 shows an example of a preferred example of the photodetector employed in this invention. This photodetector comprises a central element 28 provided with a cross-shaped slit 28 and four marginal elements 30a to 30d. FIG. 10 shows an example of an electric circuit in which the photodetector shown in FIG. 9 is employed for detecting focus. In FIG. 10, the four marginal elements 30a to 30d of the photodetector shown in FIG. 9 are connected in parallel with each other and connected with the gate of an FET 31. With the drain of the FET 31 is connected capacitor 32 which is used for taking out an alternating current component of the same frequency as that of the vibration of the light refracting element 11. The signal taken out by the capacitor 32 is amplified by another FET 33. On the other hand, the central element 29 is connected with the gate of an FET 34 so that the output thereof is amplified thereby and the alternating current component of the output is taken out by a capacitor 35 connected with the FET 34 and is then amplified by still another FET 36.

These alternating current components put out by the FETs 33 and 36 are put into a differential amplifier 37 and the difference in output thereof is calculated thereby. By the differential amplifier 37, the output of the central element 29 is compensated in view of the alternating current output of the four marginal elements 30a to 30d. The position of the objective of the optical instrument is controlled to make the output of the differential amplifier 37 zero to find the focusing position of the lens. Thus, the focus is detected and the position of the objective is controlled.

By indicating the output of the differential amplifier 37 by use of a meter, the condition of the focus can be detected in terms of the position of the pointer of the meter. By utilizing the output of the differential amplifier 37 as the input of the servomotor which controls the position of the objective 10, an automatic focus control can be conducted.

I claim:

1. A device for detecting focus in an optical instrument which has an objective, said device comprising a light refracting optical element located substantially on a focal plane of the objective of the optical instrument, said light refracting optical element having different parts effecting refraction of light in different directions, a transparent disc having disposed therein at the center thereof said light refracting element, means for periodically moving said transparent disc and said optical element in a plane parallel to the focal plane in such a direction so that said different parts of said optical element are periodically brought to a point on said plane parallel to the focal plane, a photodetector located behind said light refracting optical element, and means for focusing on said photodetector an image of the image focused by said objective, wherein said photodetector comprises a central element for measuring the brightness of the central part of the image focused by said focusing means and a marginal element for measuring the brightness of the part of said image adjacent to said central part thereof, and said device further comprises means for compensating the output of said central element of the photodetector by the output of said marginal element of the photodetector.

2. A focus detecting device as defined in claim 1 further comprising an optical slit provided in front of said photodetector.

3. A focus detecting device as defined in claim 2 wherein said marginal element of the photodetector comprises a plurality of elements which are electrically independent of each other.

4. A focus detecting device as defined in claim 1 wherein said compensating means is a differential amplifier into which the output of said central element and the output of said marginal element are put so that the difference between the two outputs are taken out.

5. A device for detecting focus in an optical instrument having an axially movable objective mounted therein for focusing an image, said device comprising a light refracting optical element mounted within said instrument and located substantially on a focal plane of the objective of the optical instrument, said light refracting optical element having different parts effecting refraction of light in different directions, a transparent disc having said light refracting element disposed therein at the center thereof, means engaging said transparent disc for periodically moving said transparent disc and said optical element in a plane parallel to the focal plane of the optical element in a direction such that said different parts of said optical element are periodically brought to a point on said plane parallel to the focal plane, a photodetector mounted within said instrument behind said light refracting optical element, means for focusing an image of the image focused by said objective on said photodetector, said focusing means being mounted within said instrument between said optical element and said photodetector, said photodetector comprising a central element for measuring the brightness of the central part of the image focused by said focusing means and a marginal element for measuring the brightness of the part of said image adjacent to said central part, said central element and said marginal element giving an output representing the quantity of said brightness measured and means connected to said photodetector for compensating the output of said central element of the photodetector by the output of said marginal element of the photodetector.

6. A focus detecting device as defined in claim 5 including a cross shaped optical slit mounted in said instrument in front of said photodetector.

* * * * *